United States Patent [19]

Hildebrandt et al.

[11] 4,402,822

[45] Sep. 6, 1983

[54] METHOD OF EFFECTING HIGHLY EXOTHERMIC REACTIONS

[75] Inventors: Ullrich Hildebrandt, Pullach; Udo Lang, Munich; Berndt Hörner, Munich; Walter Schramm, Munich, all of Fed. Rep. of Germany

[73] Assignee: Linde AG, Wiesbaden, Fed. Rep. of Germany

[21] Appl. No.: 204,534

[22] Filed: Nov. 6, 1980

[30] Foreign Application Priority Data

Nov. 9, 1979 [DE] Fed. Rep. of Germany ....... 2945353

[51] Int. Cl.³ .............................................. C10G 1/06
[52] U.S. Cl. .......................................... 208/10; 208/9
[58] Field of Search .................................. 208/9, 10

[56] References Cited

U.S. PATENT DOCUMENTS

| | | | |
|---|---|---|---|
| 3,941,869 | 3/1976 | Fuchs | 423/533 X |
| 4,152,407 | 5/1979 | Fuchs | 423/533 X |
| 4,189,374 | 2/1980 | Kirby et al. | 208/10 X |
| 4,211,631 | 7/1980 | Carr et al. | 208/10 X |
| 4,268,375 | 5/1981 | Johnson et al. | 208/48 Q X |
| 4,298,454 | 11/1981 | Aldridge et al. | 208/10 |

FOREIGN PATENT DOCUMENTS 2010897  7/1979  United Kingdom ................. 208/10

*Primary Examiner*—Delbert E. Gantz
*Assistant Examiner*—William G. Wright
*Attorney, Agent, or Firm*—Karl F. Ross; Herbert Dubno

[57] ABSTRACT

A method of and an apparatus for carrying out exothermic reactions in suspensions containing catalyst particles as well as a reaction participant and wherein the suspension is pumped to the reaction pressure and thereby fed to the reaction vessel. According to the invention, the suspension is preheated, before entering the reaction zone in the same pressurized vessel by direct heat exchange with reaction products from the reaction zone before the suspension is passed into the latter.

4 Claims, 2 Drawing Figures

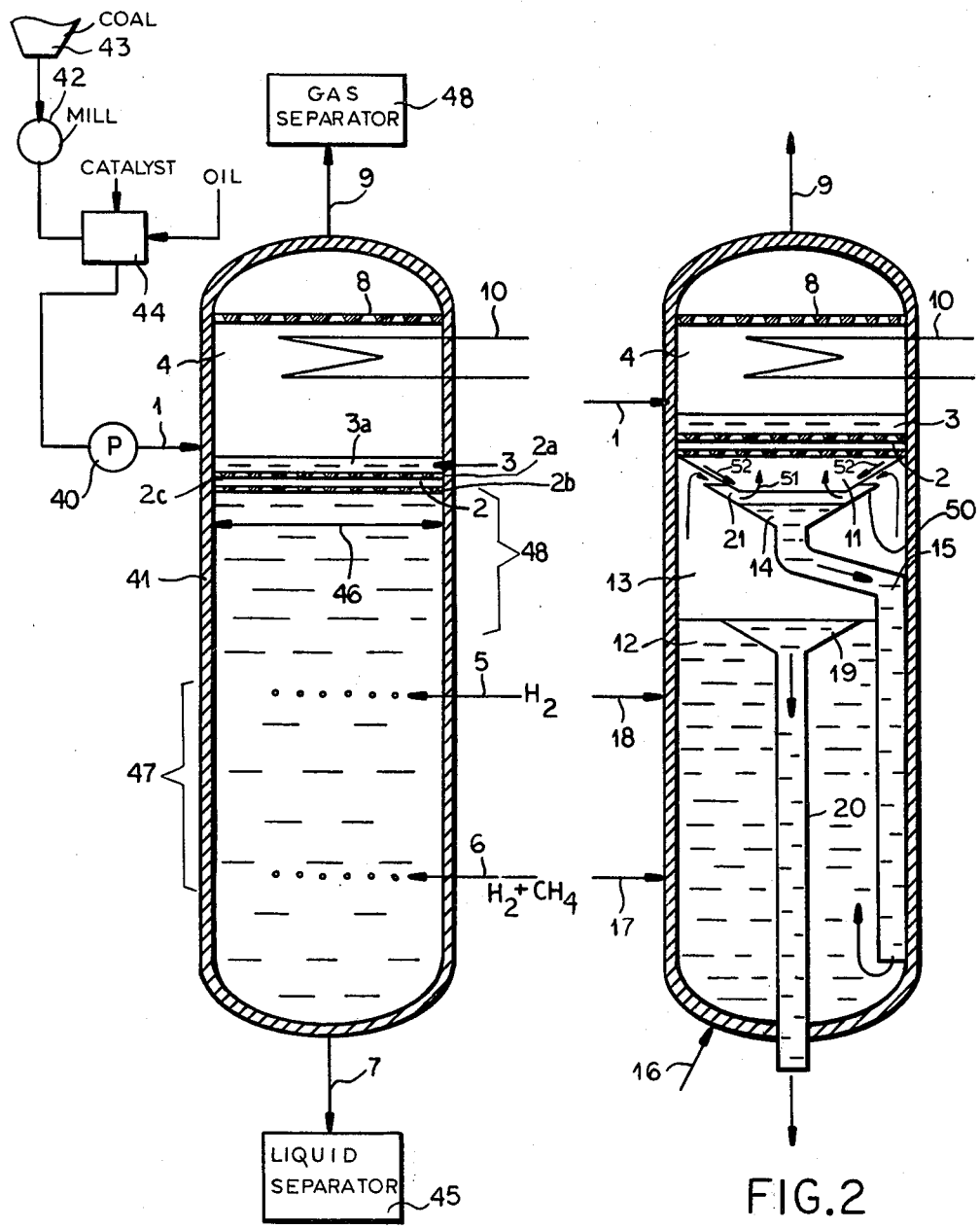

METHOD OF EFFECTING HIGHLY EXOTHERMIC REACTIONS

FIELD OF THE INVENTION

Our present invention relates to a method of effecting highly exothermic reactions and especially catalytically induced, promoted or sustained reactions which are effected at an elevated temperature and pressure. More particularly, the invention relates to catalytically produced heterogeneous exothermic reactions in which the reactants include a reaction participant contained in a suspension of catalyst particles.

BACKGROUND OF THE INVENTION

While highly exothermic chemical reactions are widely used to produce a large variety of products, in certain heterogeneous reactions, especially the hydrogenation of coal, the reaction is effected at an elevated pressure and high temperature utilizing a reaction participant (e.g. the coal) in a suspension in an appropriate fluid carrier of particles of a catalyst.

In the usual case, this suspension of catalyst particles in a fluid medium containing at least one reaction participant, is pumped to the reaction pressure and forced into the reactor at which the highly exothermic reaction is carried out. The pressurized suspension is frequently preheated in a plurality of indirect heat exchangers to a temperature close to the desired reaction temperature before being fed to the reaction zone.

At the reaction zone, additional participants can be added if they are not already present in the suspension. In the case of coal hydrogenation and liquefaction, for instance, hydrogen can be fed to the suspension at the reaction zone.

The use of a plurality of indirect heat exchangers for preheating the suspension has two major disadvantages. Firstly, separate indirect heat exchangers are expensive to make, clean and maintain, and have costly components such as heat exchange walls of low corrosivity materials. Furthermore, pressure losses in traversing such indirect heat exchangers are pronounced. Because of these high pressure drops, the pumps and other elements designed to build up the reaction pressure for highly viscous suspensions have high energy consumption.

Thus conventional systems using one or more indirect heat exchangers for preheating viscous suspensions of the type described and particularly suspensions of coal particles in oil containing a catalyst for hydrogenation and liquefaction, are expensive to operate, environmentally detrimental and involve high capital expenditure.

OBJECTS OF THE INVENTION

It is the principal object of the present invention to provide an improved method of effecting highly exothermic reactions with suspensions of the type described which eliminates disadvantages of earlier systems.

More specifically, an object of the invention is to provide an improved method of effecting such exothermic reactions without the high cost, in terms of capital and energy, of preheating characterizing earlier methods.

Yet another object of the invention is to provide an improved method of hydrogenating and liquifying coal.

SUMMARY OF THE INVENTION

These objects and others which will become apparent hereinafter are attained, in accordance with the present invention, in a method for effecting a highly exothermic reaction which comprises forming a viscous suspension containing at least one reaction participant in a liquid vehicle which also contains a catalyst, preferably in suspended form, pumping the suspension to the reaction pressure, feeding the suspension to a preheating zone of the reaction products from the reaction zone, thereby preheating the suspension, conducting the preheated suspension to the reaction zone within the vessel, and effecting the exothermic reaction in the reaction zone at the elevated pressure and at an elevated temperature.

Since the suspension passes through a preheating zone in the pressurized reaction vessel itself and is subjected to direct heat exchange in the preheating zone with reaction products, the preheating zone can be fully integrated with the reaction zone in a single reaction vessel and the high capital costs of separate indirect heat exchangers are eliminated.

The reaction vessel can thus be formed between the inlet or the suspension and the exothermic reaction zone, with a preheating zone in the form of an inlet flow cross section for the suspension at which direct contact between the latter and hot reaction products is effected.

A conventional reaction vessel can be enlarged relatively simply and inexpensively to accommodate this preheating zone and, because the preheating zone can communicate directly with the reaction zone, pressure losses across the preheating zone are minimized.

The direct heat exchange, moreover, permits more efficient utilization of recoverable sensible heat of the reaction products than can be achieved with indirect heat exchange.

In the preferred and best mode embodiment of the reaction, the reaction vessel is upright and vertically elongated and the preheating zone is provided within this vessel directly above the reaction zone or, conversely, the reaction zone is provided immediately below the preheating zone.

In this case, the suspension is introduced into the upper portion of the reaction vessel and contacts, as it passes downwardly into the reaction zone, lighter reaction products which tend to rise in the vessel to effect the indirect heat exchange. In coal hydrogenation and liquefaction systems, such lighter components are generally reaction products which are gaseous at the reaction temperature. These reaction products can, after traversing the preheating zone in counterflow to the suspension, be readily withdrawn from the reactor at a location above the preheating zone. These reaction products can, in part, condense upon cooling in contact with the suspension and are either decanted off or are reentrained with the suspension into the reaction zone. The preheating zone can thus be provided with a decanter if desired.

It has been found to be advantageous, moreover, to control the reaction temperature by introducing a cold gas at a plurality of locations into the reaction zone, this cold gas being either a reaction participant such as hydrogen or a cooled product, although it can also be a material relatively inert to the reaction. This permits the reaction temperature to be moderated in spite of the strongly exothermic nature of the reaction.

The composition of reaction products which are permitted to combine with the suspension for reentrainment to the reaction zone therewith can be controlled, in accordance with another feature of the invention, by the controlled cooling of a zone above the preheating zone. This cooling allows, moreover, control of the composition of the gases flowing from the reactor by varying the components of the gas above the preheating zone which are condensed out. Since heavy components are more readily condensed from the gases these may be preferentially recycled to the reaction zone so that the product mix will contain predominantly light components in the gases recovered.

According to yet another feature of the invention, the upright, vertically elongated reaction vessel is a pressure vessel whose lower portion is formed with the reaction zone and whose upper portion defines a preheating zone and a vapor or gas space in which gaseous reaction products can accumulate.

This reactor is provided with a feed duct at its upper end for introducing the suspension and a discharge duct at its upper end for gaseous reaction products. An additional duct can be provided to allow liquid reaction products to be decanted from the suspension while an outlet at the lower end of the reaction vessel can serve to enable withdrawal of liquid and residues.

According to a feature of the invention, the upper end of the reactor is provided with a distributor for uniform distribution of the suspension over the entire cross section of the vessel. The type of distributor used will, of course, depend upon the nature of the highly viscous mixture. In the case of the hydrogenation of coal, where the feed is a highly viscous and almost pasty mixture of milled coal, catalyst particles and a pasty oil, uniform distribution is achieved with a pair of spaced-apart filter grates with parallel throughgoing slots, the slots of the two grates being transverse to one another.

In an especially simple construction of the reactor of the present invention, the preheating zone lies directly above the reaction zone and no physical barrier is provided therebetween. Once the suspension is uniformly distributed across the cross section of the vessel, therefore, it passes downwardly into the reaction zone which can be formed with means at at least two spaced-apart locations for feeding cold gas to the reaction zone, at least one of the gases being hydrogen. A cooling coil is advantageously provided in the vapor space above the inlet for the suspension.

A reactor of this type operates under counterflow principles since the suspension moves downwardly while light reaction components move upwardly to collect in the gas space above the suspension. The counterflow results in turbulence at least within the preheating zone to assure intimate mixture of the rising reaction products and the falling suspension and thereby intensive heat exchange.

In many cases, the creation of turbulence tends to defeat the homogeneity of the reaction. This can be the case when the flow cross section is relatively large. It is thus advantageous to limit the reactor cross section by corresponding partitions, inserts or constricting elements within the vessel. In general such elements should be designed to narrow the region in which turbulence occurs or to pass the reaction products in the suspension in uniflow, i.e. in the same direction.

An embodiment of the present invention in accordance with the latter principles will have a further vapor collection chamber between the preheating zone and the reaction zone and as defined by partitions or the like built into the reactor. Such members can delimit the bottom of the preheating zone and establish the top of the second gas-collecting space. Means can be provided for conducting the suspension away from the preheating zone and to the bottom of the reaction zone while liquid is discharged from the top of the reaction zone and gaseous products are directed through the suspension on the partition thereof. At least to a certain extent, with this configuration, the suspension and the reaction products are passed in uniflow. This reactor construction allows newly formed reaction products to flow continuously upwardly, the flow of both the hot gas and the incoming suspension to be both downwardly, and any condensation to be carried out above the suspension via a cooler in the upper gas space.

BRIEF DESCRIPTION OF THE DRAWING

The above and other objects, features and advantages of the present invention will become more readily apparent from the following description, reference being made to the accompanying drawing in which:

FIG. 1 is a vertical axial cross-sectional view through a first embodiment of the invention in which the preheating zone opens directly into the reaction zone; and FIG. 2 is a similar section of an embodiment in which the two zones are separated from one another in accordance with the invention.

SPECIFIC DESCRIPTION

FIG. 1 shows a reaction vessel to which the suspension, e.g. of coal, oil and catalyst particles for coal liquefaction and hydrogenation, is fed by a pump 40 capable of building up the desired reaction pressure in the vessel 41. The finely divided coal particles are formed in a mill 42 to which the coal is fed from a hopper 43 and mixed with the pasty oil (vehicle) in a mixer 44. The mill 42 may be a drying mill in which the coal particles are dried.

The oil may be of any oil stable at a temperature above 500° C., can be preheated and can be recovered from a separator 45 connected to the liquid outlet 7 of the reactor.

When the coal, which has a temperature of about 60° C., is mixed with the oil which can have a temperature of 250° C. from the liquid separator 45, the resulting slurry has a temperature of about 170° C. with which it is pumped into the reaction vessel 41 at 3 and with the reaction pressure which can be between 150 bar and 300 bar, preferably 250 bar.

The suspension 3 is introduced above a distributor device 2 which consists of a pair of sieve grates 2a and 2b having a space 2c between them, each grate 2a, 2b being made up of a plurality of parallel bars of trapezoidal cross section which define downwardly widening slits between them. The slits of the two grates are transverse to one another, i.e. one set of slits may lie parallel to the plane of the paper in FIG. 1 while another set of slits is perpendicular to the plane of the paper.

We have found that this distributor arrangement ensures uniform feeding of the suspension to the full cross section 46 of the vessel below the distributor. Above the distributor a layer 3a of the suspension is formed.

Gaseous reaction products and unreacted hydrogen, rising from the reaction zone 47, pass through this layer 3 and collect in a vaport space 4 above the layer.

A limited reaction can occur in the region of the layer 3a although the major part of this suspension passes unreacted through the grates 2a and 2b into a preheating zone directly below the distributor a. The preheating zone is represented at 48 in FIG. 1.

In this zone, intimate contact is effected between the rising lighter and the gaseous reaction products so that the suspension is subjected not only to a direct heat exchange and preheating but also to a dilution with heavier reaction products which tend to move downwardly with the suspension as they are cooled by this direct heat exchange. Above the suspension the lighter reaction products are concentrated.

In the lower region of the pressure vessel and especially in the region 47, the exothermic coal hydrogenation is effected, resulting in a rapid temperature increase. Hydrogen can be introduced by appropriate gas inlet means represented at 5 or 6. The inlets 5 and 6, moreover, serve to feed cold gas into the reactor so that the temperature in the reaction zone 47 is held in the region of 430° to 470° C.

The cold gas can be the hydrogen required for hydrogenation or a gas stream rich in hydrogen and methane as separated from the gaseous reaction products by, for example, a gas separator 48 from which the hydrogen and methane mixture is recycled to inlet 6. The cold gas temperature can be about 150° C. or less.

Since the coal hydrogenation is usually carried out with a hydrogen excess, the cold gas fed can serve as a particularly convenient and simple way of regulating the temperature in the reaction zone.

In the reaction zone, all reaction products which have a boiling point of 430° to 470° C. at the process pressure pass as gases upwardly in counterflow to the descending suspension and collect in the space 4 to the extent that they do not condense upon cooling in heat exchange with upper portions of the suspension.

The liquid reaction products, catalyst particles and vehicle oil are withdrawn at 7 and separated at 45, at least one portion recovered by vacuum distillation being the oil vehicle mentioned above.

The gaseous reaction products are passed through a filter 8 in the form of a net which prevents liquid particles from being entrained. The liquid particles trapped by this droplet separator are returned to the suspension and carried thereby into the reaction zone. The gas, usually at a temperature between 350° and 400° C., contains all of the light hydrocarbons produced by the hydrogenation as well as components boiling in the range of gasoline and gas oil or thereabove as well as surplus hydrogen. These components can be separated from one another by conventional gas rectification procedures.

The product mix is controlled by a cooling coil 10 which serves to regulate the outlet temperature of the product and to condense the heavier components of the gas mix as desired.

The embodiment of FIG. 2 differs from that of FIG. 1 in that a separation is provided between the preheating zone 11 and the reaction zone 12. A further gas space 13 is provided between these zone.

The suspension leaving the distributor 2 is subjected to direct heat exchange in uniflow with the gaseous reaction product which pass upwardly around the lip of a funnel-shaped member 50 and then in the direction of the arrows 51 upwardly.

The suspension passes in the same direction (arrows 52) into the funnel 50 where it is collected at 14. From this region the preheated suspension is carried by a downcomer 15 through the reaction zone 12 to be discharged at the bottom of this reaction zone, the suspension then flowing upwardly.

Hydrogen-containing gas is introduced at 16, 17 and 18 to effect hydrogenation and to control the temperature in the reaction zone as previously described. Rising gaseous reaction products collect in the chamber 13 which serves as a heat separator, while the liquid products are collected by an overflow funnel 19 and are carried away by a pipe 20 through the bottom of the reactor.

The gases collected at 13 flow through the passages 21 in the preheating zone 11 for direct heat exchange with the suspension. The cooling of these gases results in the condensation of a dilution oil which remains in the suspension and passes therewith into the reaction zone.

We claim:
1. A method of effecting a highly exothermic reaction at an elevated pressure and temperature, comprising the steps of:
    forming a suspension in a liquid vehicle of at least one reaction participant and solid catalyst particles capable of inducing exothermic reaction thereof;
    pumping said suspension into the preheating zone of a reaction vessel subdivided vertically into said preheating zone and a reaction zone communicating with and below said preheating zone and receiving preheated suspension therefrom, the pumping of said suspension into the preheating zone of said reaction vessel generating said pressure therein;
    preheating said suspension in said preheating zone of said vessel by direct heat exchange with at least partially gaseous reaction products of said reaction from said reaction zone at said elevated temperature in said vessel followed by separation of the gaseous reaction products from the preheated suspension, the separation of the gaseous reaction products from the preheated suspension being effected in said preheating zone; and
    feeding the preheated suspension into said reaction zone and causing said exothermic reaction in said preheated suspension to produce said reaction products substantially exclusively in said reaction zone whereby light reaction products produced in said reaction zone rise therein, are separated from the suspension in the reaction zone and are passed directly into said preheating zone to heat the suspension introduced thereto.

2. The method defined in claim 1, further comprising the step of controlling the temperature in said reaction zone by introducing a cold gas into said reaction zone.

3. The method defined in claim 2, further comprising the steps of accumulating gaseous products above said suspension in said vessel, withdrawing accumulated gases as a product gas mix from said vessel, and controlling the composition of said mix by cooling the collected gases, thereby condensing components therefrom.

4. The method defined in claim 3 wherein said suspension is a mixture of coal and catalyst particles in an oil vehicle.

* * * * *